(12) United States Patent
Kim et al.

(10) Patent No.: US 7,361,386 B2
(45) Date of Patent: Apr. 22, 2008

(54) FUNCTIONAL COATINGS FOR THE REDUCTION OF OXYGEN PERMEATION AND STRESS AND METHOD OF FORMING THE SAME

(75) Inventors: George E. Kim, Quebec (CA); Julie M. Schoenung, Santa Ana, CA (US); Virgil Provenzano, Bethesda, MD (US); Enrique J. Lavernia, Santa Ana, CA (US); Leonardo Ajdelsztajn, Los Angeles, CA (US)

(73) Assignees: The Regents of the University of California, Oakland, CA (US); Perpetual Technologies, Ile Des Soeurs, Quebec (CA)

( * ) Notice: Subject to any disclaimer, the term of this patent is extended or adjusted under 35 U.S.C. 154(b) by 379 days.

(21) Appl. No.: 10/624,254

(22) Filed: Jul. 22, 2003

(65) Prior Publication Data

US 2004/0131865 A1 Jul. 8, 2004

Related U.S. Application Data

(60) Provisional application No. 60/397,520, filed on Jul. 22, 2002, provisional application No. 60/405,382, filed on Aug. 23, 2002.

(51) Int. Cl.
C23C 4/08 (2006.01)

(52) U.S. Cl. ............... 427/456; 428/328; 428/632; 428/697; 428/699; 428/701; 428/702; 416/241 R; 427/453; 427/454; 427/455

(58) Field of Classification Search ............ 428/632, 428/328, 697, 699, 701, 702; 416/241 R; 427/453, 454, 455, 456
See application file for complete search history.

(56) References Cited

U.S. PATENT DOCUMENTS

| 5,635,654 | A  | * | 6/1997  | Hebsur et al. | ............... | 75/244  |
|-----------|----|---|---------|---------------|----------------|---------|
| 5,939,146 | A  | * | 8/1999  | Lavernia      | ............... | 427/446 |
| 6,168,875 | B1 | * | 1/2001  | Cybulsky et al. | ............. | 428/633 |
| 6,610,419 | B1 | * | 8/2003  | Stamm         | ............... | 428/632 |
| 6,805,725 | B1 | * | 10/2004 | Hebsur        | ............... | 75/245  |
| 2003/0186075 | A1 | * | 10/2003 | Zhao et al. | ............... | 428/670 |

* cited by examiner

*Primary Examiner*—John J. Zimmerman
*Assistant Examiner*—Aaron Austin
(74) *Attorney, Agent, or Firm*—Myers Dawes Andras & Sherman LLP

(57) ABSTRACT

The oxidation behavior of the bond coat is improved using a HVOF nanostructured NiCrAlY coating. NiCrAlY powder is mechanically cryomilled and HVOF sprayed onto Ni-based alloy to form a nanocrystalline bond coat. Oxidation is performed on the coating to form the thermally grown oxide layer (thermally grown oxide). After heat treatment at 1000° C. for 24 and 95 hour, a homogeneous $\alpha$-$Al_2O_3$ layer is formed on top of the bond coat. The nanostructured characteristic of the coating and the presence of $Al_2O_3$ within the cryomilled powders (oxidation occurred during cryomilling process) affects the nucleation of the alumina layer on the top of the coating. The formation of a continuous thermally grown oxide layer protects the coating from further oxidation and avoids the formation of mixed oxide protrusions, such as those presented in the coating sprayed using the as-received powder.

4 Claims, 19 Drawing Sheets

FUNCTIONAL COATINGS FOR THE REDUCTION OF OXYGEN PERMEATION AND STRESS AND METHOD OF FORMING THE SAME

RELATED APPLICATIONS

The present application is related to U.S. Provisional Patent Application Ser. No. 60/397,520, filed on Jul. 22, 2002, and Ser. No. 60/405,382, filed on Aug. 23, 2002, which are incorporated herein by reference and to which priority is claimed pursuant to 35 USC 119.

BACKGROUND OF THE INVENTION

1. Field of the Invention

The invention relates to the field of metallurgical coatings and in particular to nanocrystalline thermal barrier coatings.

2. Description of the Prior Art

In order to increase the efficiency of gas turbine engines, the hot-section stationary components (mainly combustors, transition pieces, and vanes) are protected with thermal barrier coatings (TBCs). In addition to providing the thermal insulation to the nickel-based superalloy components, TBCs also provide protection against high temperature oxidation and hot corrosion attack. The conventional TBCs that are used in naval (diesel) engines, in military and commercial aircraft, and in land-based gas turbine engine components, consist of a duplex structure made up of a metallic MCrAlY (M stands for either Co, Ni and/or Fe) bond coat and Yttria partially stabilized zirconia (YPSZ) ceramic top coat.

Presently, however, the full potential of the YPSZ TBCs is yet to be realized due mainly to the cracking problem that occurs along or near the bond coat/top coat interface after a limited number of cycles of engine operation. This interfacial cracking, often leading to premature coating failure by debonding (spallation) of the top coat from the bond coat, has been amply demonstrated from microstructural evidence that was obtained from in-service degradation of deposited coatings as well as from laboratory experiments that have been conducted. The thin oxide layer that grows on top of the bond coat, at the bond coat/top coat interface, plays a critical role in the interface cracking. It is quite evident that this cracking problem negatively impacts the coating performance by reducing both the engine efficiency (because the engine operating temperature is kept below its optimum temperature) and the lifetime of the engine components. In turn, this greatly affects the reliability and the efficiency of the entire engine system.

In summary, coating failure at the interface has greatly limited the use of yttria-partially-stabilized zirconia TBCs both for military and civilian applications. The TBCs that are used to protect the hot-section components are deposited on nickel-based superalloy substrates by first depositing a MCrAlY bond coat and then depositing the YPSZ as the top coat. The typical thickness of the bond and top coats are 100/150 µm and 150/250 µm, respectively. Conventionally, two different thermal spray processes are used to deposit the TBC top coat: one is the electron beam physical vapor deposition (EB-PVD) process and the other is the atmospheric plasma spraying (APS) process; the metallic bond coat is typically deposited by vacuum plasma spray (VPS), by APS, and recently, by high-velocity oxy-fuel (HVOF).

The bond coat surface, onto which the YPSZ top coat is disposed, has a thin oxide layer that consists mostly of various oxides (NiO, $Ni(Cr,Al)_2O_4$, $Cr_2O_3$, $Y_2O_3$, $Al_2O_3$). The presence of this thin oxide layer plays an important role in the adhesion (bonding) between the metallic bond coat and the ceramic top coat. However, during engine operation, another oxide layer forms in addition to the native oxide. This second layer, also mostly alumina, is commonly referred to as the thermally grown oxide (TGO) and slowly grows during exposure to elevated temperatures. Interfacial oxides, in particular the TGO layer, play a pivotal role in the cracking process. It is believed that the growth of the TGO layer leads to the build up of stresses at the interface region between the TGO layer and top coat.

These stresses are mainly caused by the following two factors: (1) the thermo-mechanical mismatch between the metallic bond coat and the ceramic top coat; and, (2) a volume expansion at the interface region resulting from the formation of the TGO layer. Therefore, it is reasonable to assume that crack nucleation and its subsequent propagation occur when the interface stresses reach some critical value. That is to say, when the thickness of the TGO layer grows to some critical value.

Other mechanisms have been proposed to contribute to interface cracking. For example some researchers have suggested that a contributing factor might be the inhomogeneous distribution of oxide phases; others have hypothesized that the growth of the TGO can produce interfacial damage leading to microcracking and separation and that final failure is caused by the coalescence of these microcracks. Further, another proposed mechanism suggests that severe bond coat oxidation significantly lowers both the adhesion and the fracture energy between the top and the bond coats.

Although a great deal of papers and books have been published relating to thermal barrier coatings, there has yet to be any work on introducing a nanostructured, nanocomposite bond coat layer below the top coat in the thermal barrier coatings.

One of the problems in applying a ceramic coating as found in a thermal barrier coating, relates to the mismatch in coefficient of thermal expansion between the two materials. This mismatch results in the erection of residual stress and a compromise in the bond strength at or near the interface. By incorporating a layer of single-composition or functionally graded nanostructure cermet composite layer, one can reduce the mismatch between the thermal barrier coatings. This could lead to a more thermal shock resistant top-and-bond-coat system.

The problem of thermally grown oxide growth and its negative effect on the top-and-bond-coat integrity has yet to be solved. The growth of thermally grown oxide has been found to be the major source of top-and-bond-coat failure for high temperature applications. As the oxide thermally grows, it exerts stress in the adjacent top coat; when this stress level exceeds the cohesive strength of the top coat material, failure in the form of spalling of the top coat occurs.

BRIEF SUMMARY OF THE INVENTION

One objective of the invention is to modify the microstructure of the MCrAlY bond coat (in a thermal barrier coating) in a controlled way prior to exposure to high temperatures, in order to control the subsequent changes during high temperature exposure. More specifically, the structure, composition, and growth rate of the thermally grown oxide (TGO) is controlled to ultimately improve the performance of TBCs. According to the invention a nanostructure is provided in the bond coat and, consequently, nanocrystalline dispersoids are introduced into the structure.

The purpose of the dispersoids is to stabilize the nanocrystalline structure and to nucleate the desirable α-Al$_2$O$_3$ in the TGO.

For coarse grain coatings, our observation of oxidation experiments suggest that a discontinuous alumina layer forms. This leads to the formation of oxide protrusions on the top of the coating, constituted basically of NiO, Cr$_2$O$_3$ and Ni(Cr,Al)$_2$O$_4$ spinels. The presence of these oxides increases the volume of the TGO layer, which is detrimental for the TBC coating service life, promoting cracking and spallation of the ceramic top coating.

The formation of the slow-growing, thermodynamically stable α-Al$_2$O$_3$ layer suggests according to the invention that nanostructured MCrAlY coatings will exhibit improved oxidation behavior and that this technique is an alternative to the deposition of conventional MCrAlY bond coatings.

In particular, the invention is defined as a thermal barrier coating comprising: a substrate; a nanocrystalline, nano-composite bond coat formed on the substrate; and a ceramic top coat on the nanostructured, nano-composite bond coat.

In the illustrated embodiment the nanostructured, nano-composite bond coat is composed of nanocrystalline MCrAlY, where M stands for either Co, Ni and/or Fe, prepared using a high velocity oxy fuel (HVOF) or low pressure plasma spray (LPPS) thermal spray process onto a metallic substrate. The ceramic top coat on the nanostructured bond coat comprises a yttria partially stabilized zirconia (YPSZ) ceramic top coat.

For example, the nanostructured, nano-composite bond coat comprises a M/Cr/Al/Y system (balance:22:10:1 respectively by wt. %) bond coat deposited on a Ni-based alloy substrate using the high velocity oxy fuel (HVOF) or low pressure plasma spray (LPPS) thermal spray process. Where M is a metal or metal alloy and M comprises the balance of the weight percentages of the M/Cr/Al/Y system including any impurities.

The nanostructured, nano-composite bond coat comprises a cryomilled MCrAlY powder which is thermally sprayed onto the substrate in the presence of oxygen.

The cryomilled MCrAlY powder comprises a powder cryomilled in a liquid nitrogen environment.

The cryomilled MCrAlY powder comprises a MCrAlY powder which has been cryomilled for at least 8 hours.

In another embodiment, the nanostructured, nano-composite bond coat comprises a MCrAlY powder cryomilled in the presence of oxygen, where M stands for either Co, Ni and/or Fe, such that aluminum oxide is formed in the cryomilled powder to serve as a nucleation site for further alumina formation in the top coat and which cryomilled powder is disposed onto the substrate using a high velocity oxy fuel (HVOF) or low pressure plasma spray (LPPS) thermal spray process.

The nanostructured, nano-composite bond coat comprises a thermal sprayed bond coating which is sprayed onto the substrate in the presence of oxygen to further form aluminum oxide in the sprayed nano-composite bond coat.

The nanostructured, nano-composite bond coat comprises a sprayed bond coat nano-composite which has further been heat treated in the presence of oxygen to induce a thermally grown oxide layer (TGO) thereon.

The heat treated bond coat nano-composite has a continuous α-Al$_2$O$_3$ layer on the bond coat.

The nanocrystalline bond coat comprises a cryomilled powder which has been sufficiently cryomilled to achieve nanocrystalline grain sizes.

The invention is also defined as a method for providing the above structures and compositions.

The invention is further defined as a method for improving a MCrAlY thermal barrier coating made from MCrAlY powder, where M is a metal or metal alloy, comprising the steps of providing a nanostructured, nano-composite MCrAlY bond coat by refining the microstructure of the MCrAlY powder to nanocrystalline grain size.

The method may further comprise the step of providing a ceramic top coat on the nanostructured nano-composite bond coat.

In one embodiment the step of refining the microstructure of the MCrAlY powder to nanocrystalline grain size comprises the step of cryomilling the MCrAlY powder during which the microstructure of the MCrAlY powder is refined to nanocrystalline grain size through the in-situ formation of oxides, nitrides and/or oxynitrides.

In another embodiment the step of refining the microstructure of the MCrAlY powder to nanocrystalline grain size comprises the step of cryomilling the MCrAlY powder and refining the microstructure of the MCrAlY powder to nanocrystalline grain size during cryomilling through the introduction of Al$_2$O$_3$ particles during cryomilling. The step of refining the microstructure of the MCrAlY powder to nanocrystalline grain size during cryomilling comprises introducing nano-sized alumina particles during cryomilling or introducing nano alumina whiskers during cryomilling.

The invention is also defined as a MCrAlY thermal barrier coating made from MCrAlY powder, where M is a metal or metal alloy, and which is made by the methods described above.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The illustrated embodiment of the invention includes, but is not limited to, the two following strategies:

1. Refinement of the microstructure of the MCrAlY to nanocrystalline grain size during cryomilling through the in-situ formation of oxides ($Al_2O_3$) during the cryomilling process (cryomilling and other media); and
2. Refinement of the microstructure of the MCrAlY to nanocrystalline grain size after cryomilling through the intentional introduction of $Al_2O_3$ particles during the cryomilling process (nano alumina particles and/or nano alumina whiskers).

Both strategies involve manufacturing of nanocrystalline MCrAlY feedstock powders using attrition milling in different environments and conditions. The powders are analyzed using materials characterization techniques such as X-ray diffraction (XRD), transmission electron microscopy (TEM), chemical analysis, and thermal analysis instruments, so that the milling process and its consequences to the powder are understood. Conventional and nanocrystalline coatings are produced using different thermal spray techniques (HVOF—high velocity oxy-fuel spray and LPPS— Low pressure plasma spray). The coatings are analyzed using a micro-hardness tester, a nanoindenter, XRD, SEM, and TEM. Oxidation experiments are conducted in order to study the different oxidation behavior of the conventional and the nanocrystalline coatings produced by the two thermal spray techniques mentioned above.

Figures 1A, 1B, 1C:
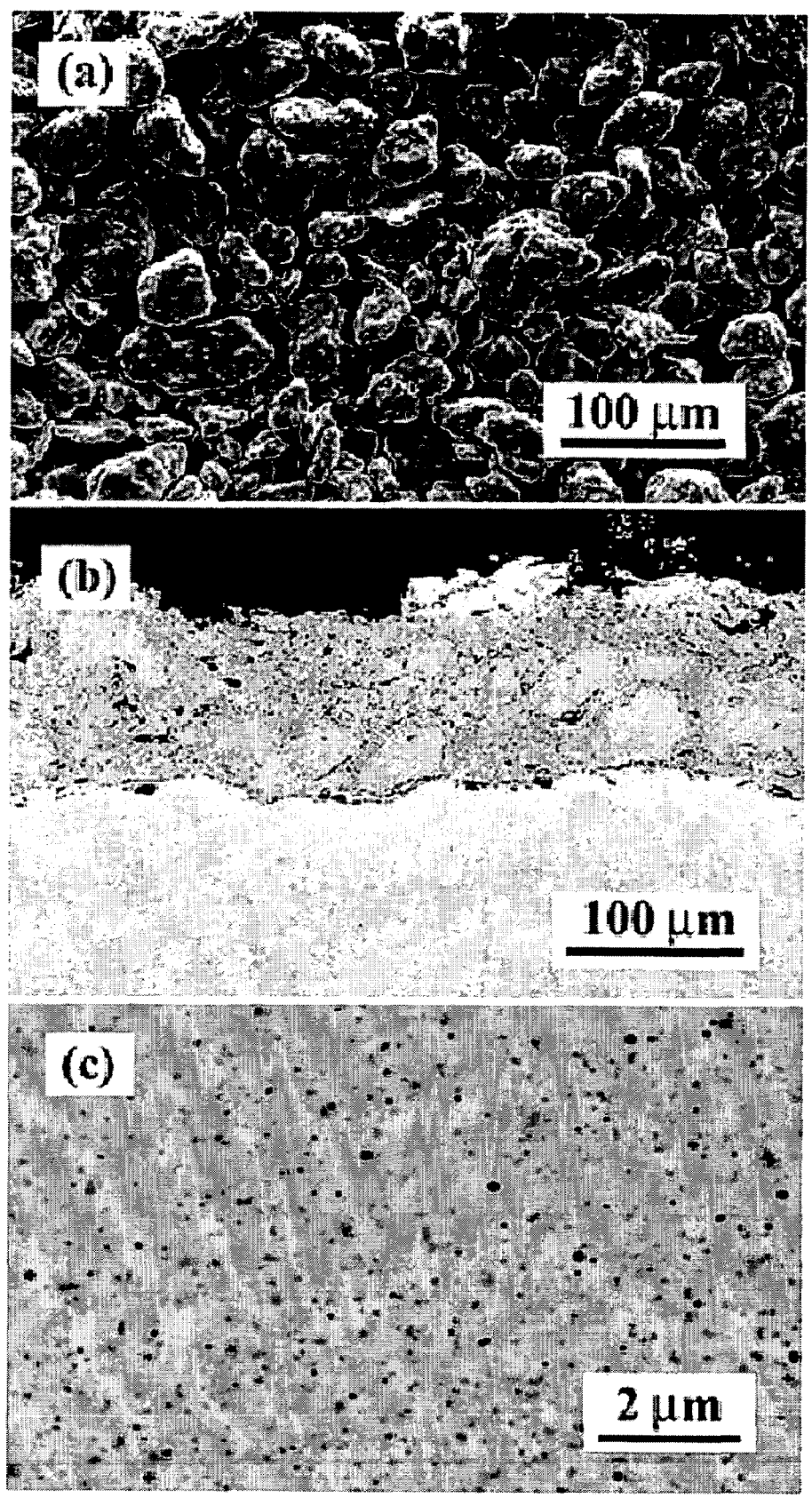
FIG. 1*a* is a microphotograph of cryomilled CoNiCrAlY powder prepared according to the invention.
FIG. 1*b* is a backscattered electron microphotograph of as cross section of an as-sprayed or untreated high velocity oxy-fuel spray (HVOF) coating prepared without cryomilling.
FIG. 1*c* is an enlarged microphotograph of the coating of FIG. 1*b*.

Consider first the effects of surface polish on the primary stage oxidation of a CoNiCrAlY coating. Commercially available gas atomized CoNiCrAlY powder with an average particle size of 40 μm is mixed with 2 wt. % γ-alumina powder with an average particle size of 39 nm and cryomilled in liquid nitrogen using a Model 1-S attritor with stainless steel balls for 8 hours. The morphology of the resulting powder agglomerates, with an average particle size of 58 μm, is shown in FIG. 1a. The chemical composition of the cryomilled CoNiCrAlY powder is shown in Table 1.

TABLE 1

The chemical composition (wt. %) of the cryomilled powder.

| Co | Ni | Cr | Al | Y | Fe | O | N |
|---|---|---|---|---|---|---|---|
| 32.7 | 32.6 | 20.1 | 7.81 | 0.39 | 5.34 | 0.48 | 0.43 |

The Fe content in the powder after cryomilling was a result of contamination from the milling media (steel balls) and the steel wall of the attritor.

The CoNiCrAlY bond coat was thermal sprayed with a high velocity oxy-fuel (HVOF) process (Table 2).

TABLE 2

HVOF deposition conditions

| | |
|---|---|
| Spray distance | 230 mm |
| Substrate cooling | Air jet |
| Carrier gas | $N_2$ |
| Combustion gas | $O_2$ + Propylene |
| $O_2$ gas flow | 3410 $mm^3/s$ |
| Propylene gas flow | 1488 $mm^3/s$ |
| Powder feed rate | 0.315 g/s |

FIG. 1b is a backscattered electron microphotograph which shows the cross section of the coating. The thickness of the coating was about 100 μm. From the enlarged backscattered electron microphotograph of FIG. 1c, we can see that the alumina particles were homogeneously dispersed within the particle during cryomilling.

Prior to the oxidation treatment, some specimens of the sprayed coating were polished with 600-grit (20 micron) sandpaper, in order to remove the surface oxide layer formed during the thermal spray process.

Both as-sprayed and polished coating specimens were isothermally oxidized at 1000° C. for 1 hour and 24 hours. XRD patterns from the oxidized surfaces are shown in FIG. 2. The presence of peaks corresponding to the metallic phases in the coating alloy is due to the relatively small thickness of the oxide scale.

Figure 2A:
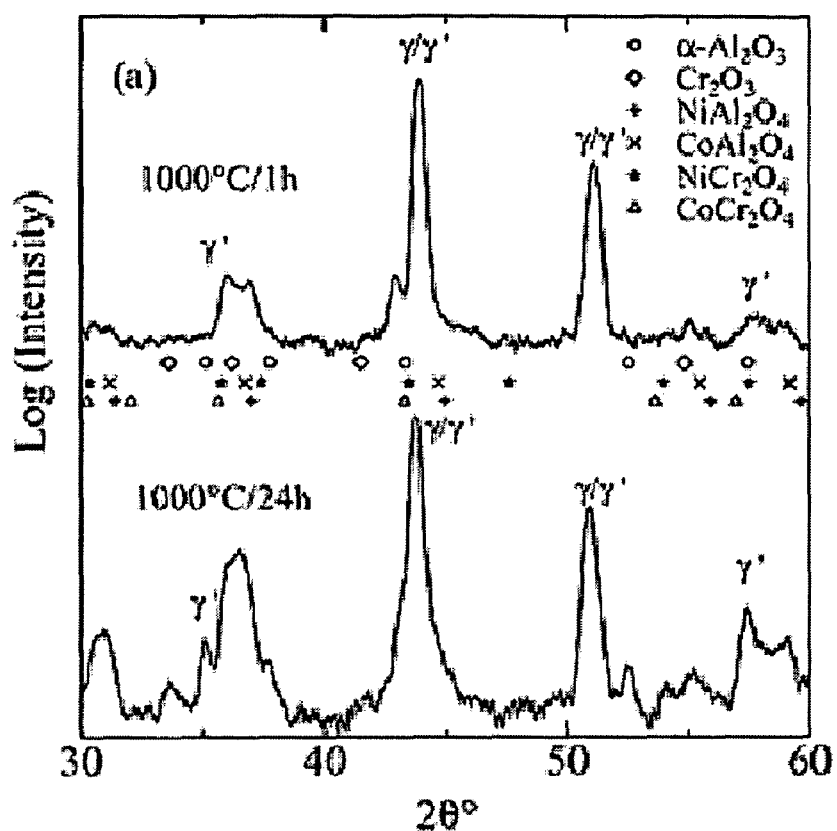
FIG. 2*a* is a graph of the x-ray diffraction (XRD) pattern from a as-sprayed coating after oxidation at 1000° C. for 1 hour in the upper curve and 24 hours in the lower curve.
Figures 3A, 3B:
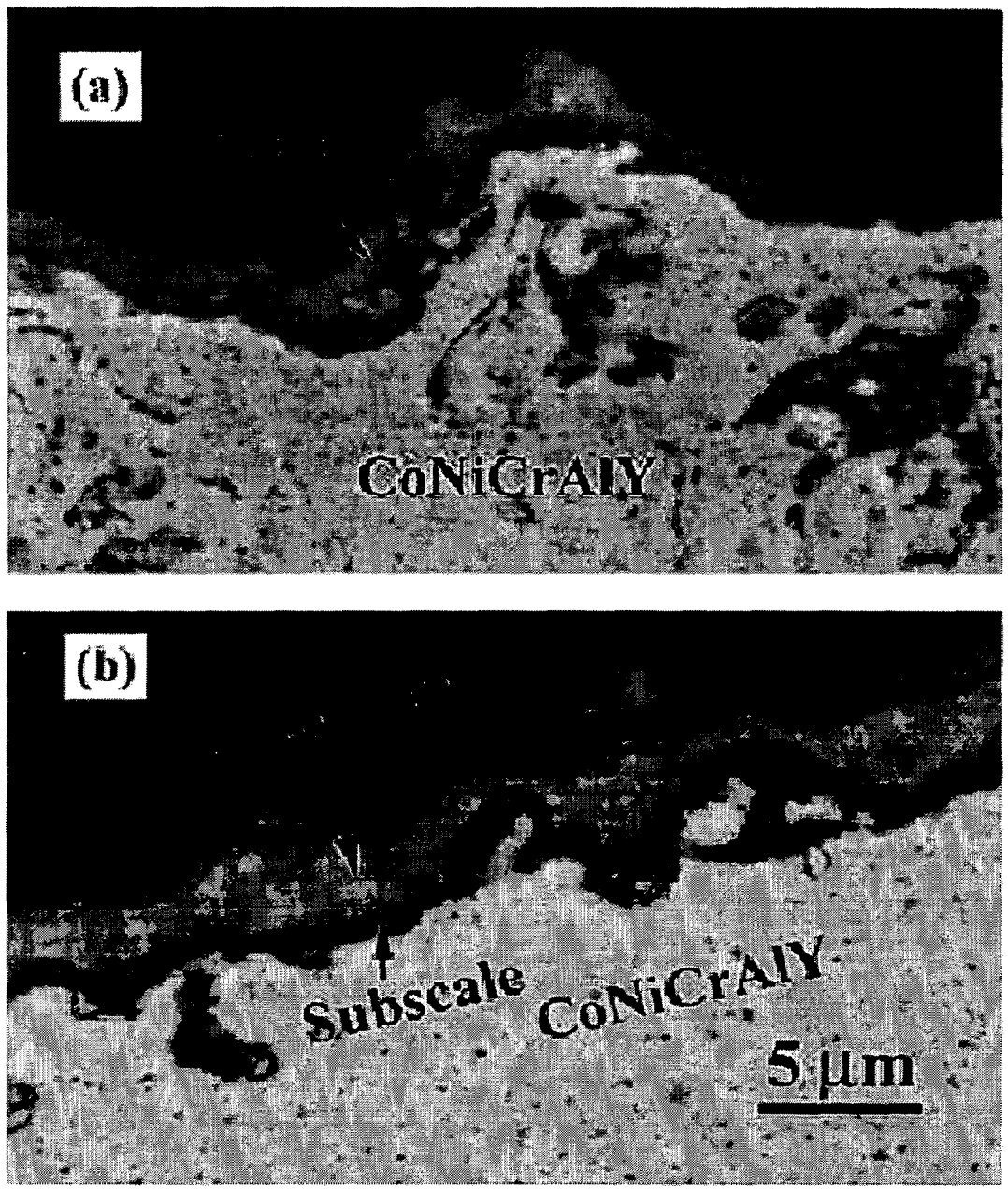
FIG. 3*a* is a backscattered electron microphotograph of a cross section of an as-sprayed or untreated high velocity oxy-fuel spray (HVOF) CoNiCrAlY coating prepared without cryomilling after oxidation at 1000° C. for 1 hour.
FIG. 3*b* is a backscattered electron microphotograph of a cross section of an as-sprayed or untreated high velocity oxy-fuel spray (HVOF) CoNiCrAlY coating prepared without cryomilling after oxidation at 1000° C. for 24 hours.
Figures 4A, 4B, 4C, 4D, 4E, 4F:
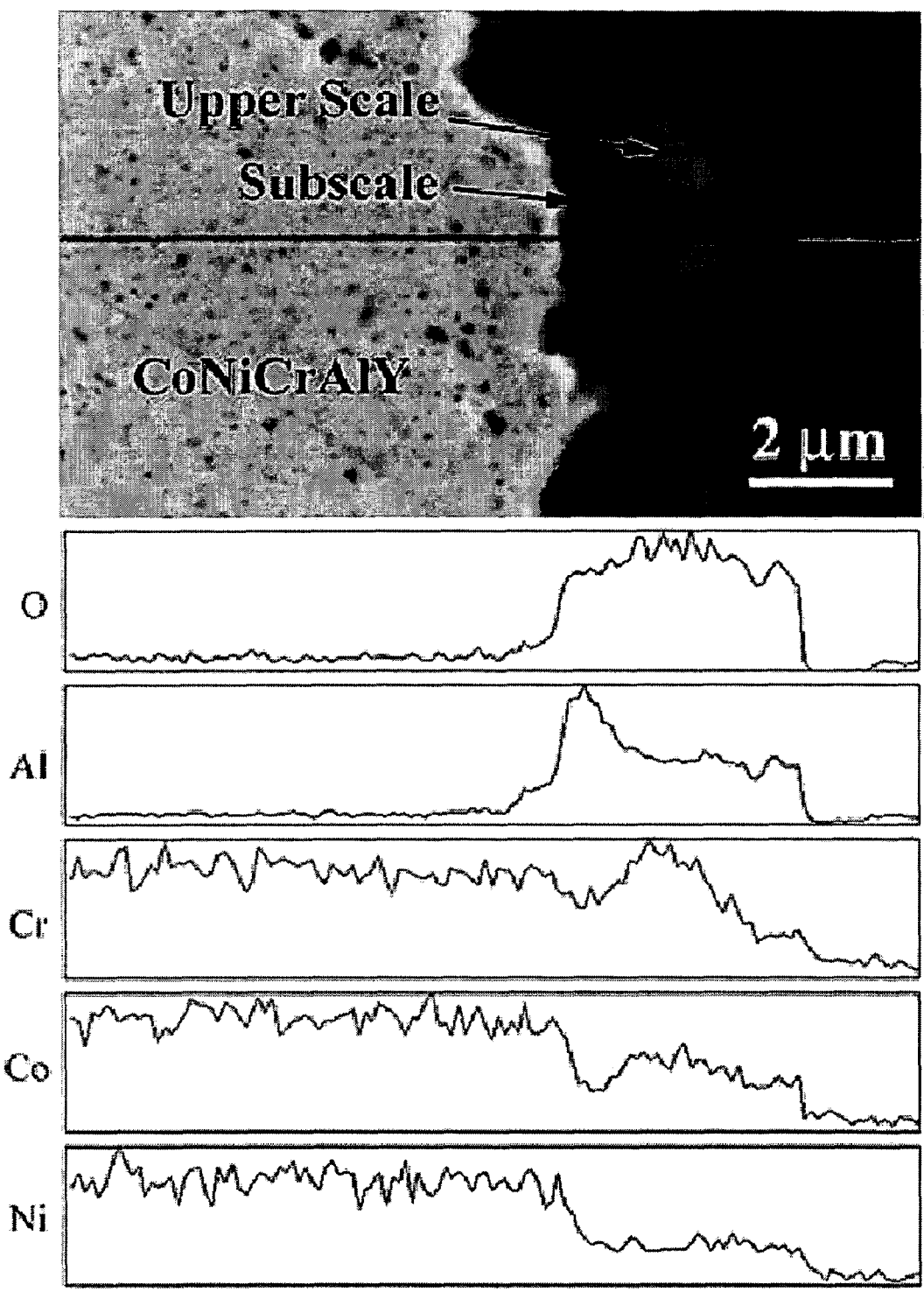
FIG. 4a is a backscattered electron microphotograph of a cross section of an as-sprayed or untreated high velocity oxy-fuel spray (HVOF) CoNiCrAlY coating prepared without cryomilling after oxidation at 1000° C. for 24 hours showing the formation of a duplex oxide scale.
FIGS. 4b-4f are energy dispersive x-ray spectrometry (EDS) line scans through FIG. 4a. of O, Al, Cr, Co and Ni respectively.

For the as-sprayed coating, after 1 hour exposure at 1000° C., the oxide scale grown on the coating consisted primarily of spinel-type oxides (upper pattern in FIG. 2a). After exposure at 1000° C. for longer time, besides the spinel-type oxides, α-alumina and $Cr_2O_3$ were also identified (lower pattern in FIG. 2a). The backscattered electron (BSE) images of the cross-section of the as-sprayed coating after 1 and 24 hour oxidation are shown in the microphotographs of FIGS. 3a and 3b. As shown in FIG. 3a, after 1 hour exposure, a single-layer oxide scale was grown. This scale consists of spinel-type oxides, as indicated by the XRD pattern in FIG. 2a. However, after 24 hour exposure, a subscale grew and the oxide scale acquired a duplex structure as shown in FIG. 3b. Higher Al content was detected in the subscale by EDS analyses shown in FIG. 4c taken along the cross sectional line 10 shown in the microphotograph of FIG. 4a. Consistent with the XRD analyses, the upper scale in FIGS. 3b and 4 are comprised of a mixture of spinel-type oxides and $Cr_2O_3$, and the subscale consists mainly of α-alumina.

Figure 2B:
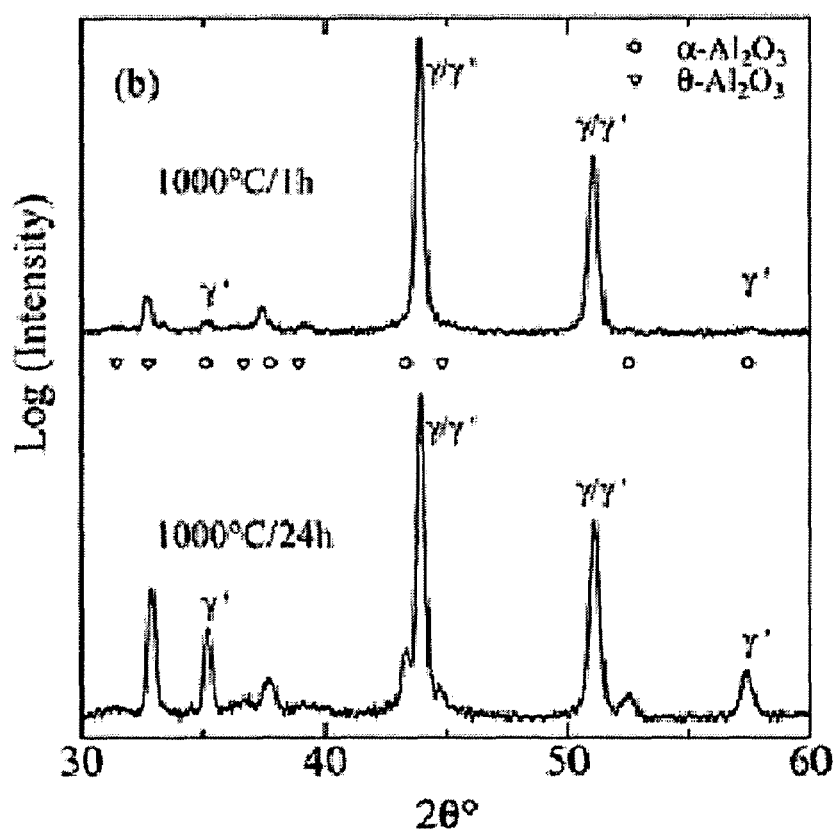
FIG. 2*b* is a graph of the x-ray diffraction (XRD) pattern from a polished HVOF CoNiCrAlY coating after oxidation at 1000° C. for 1 hour in the upper curve and 24 hours in the lower curve.
Figures 5A, 5B:
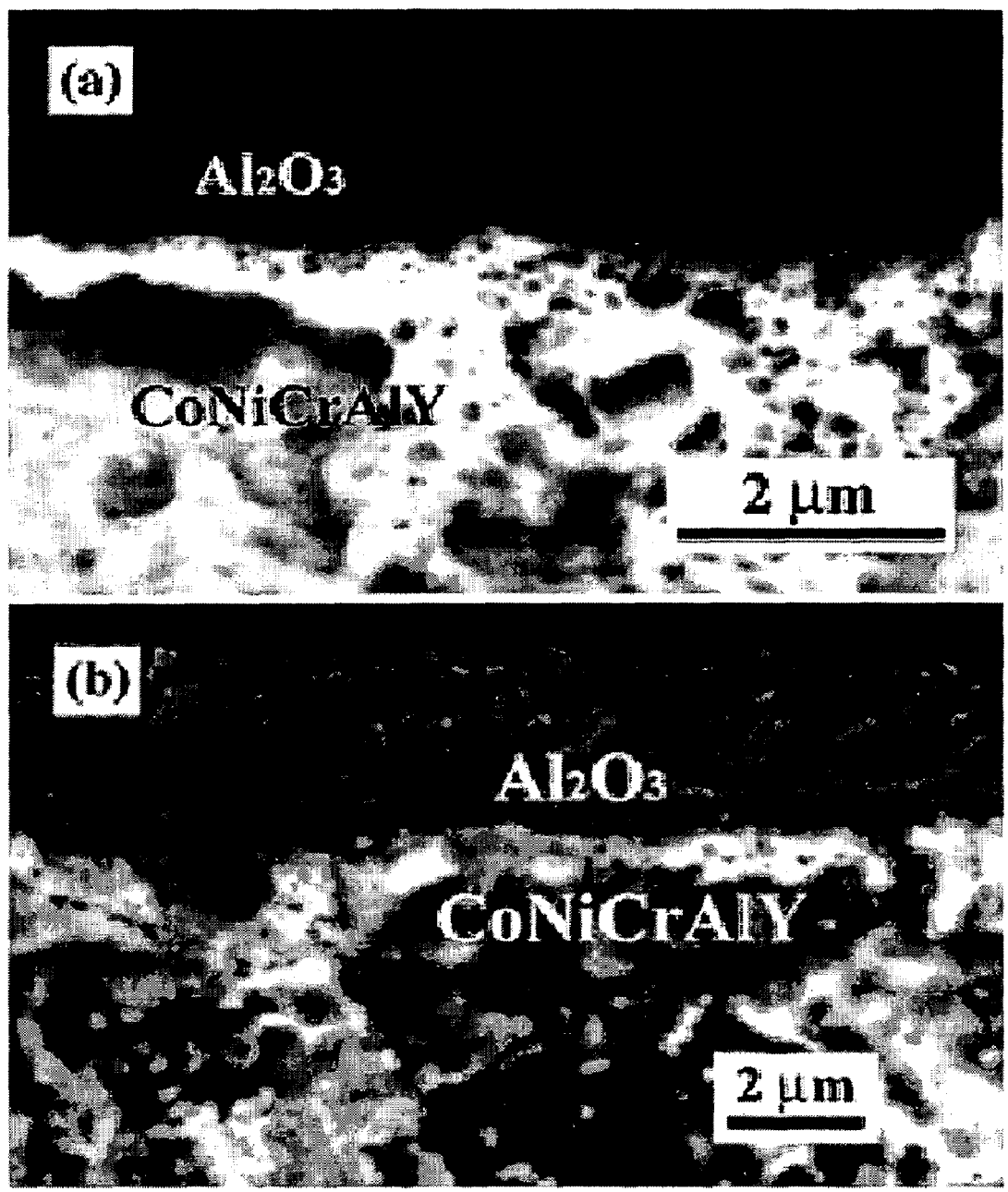
FIG. 5a is a backscattered electron microphotograph of a broken cross section of polished high velocity oxy-fuel spray (HVOF) CoNiCrAlY coating after oxidation at 1000° C. for 1 hour.
FIG. 5b is a backscattered electron microphotograph of a broken cross section of polished high velocity oxy-fuel spray (HVOF) CoNiCrAlY coating after oxidation at 1000° C. for 24 hours.
Figures 6A, 6B:
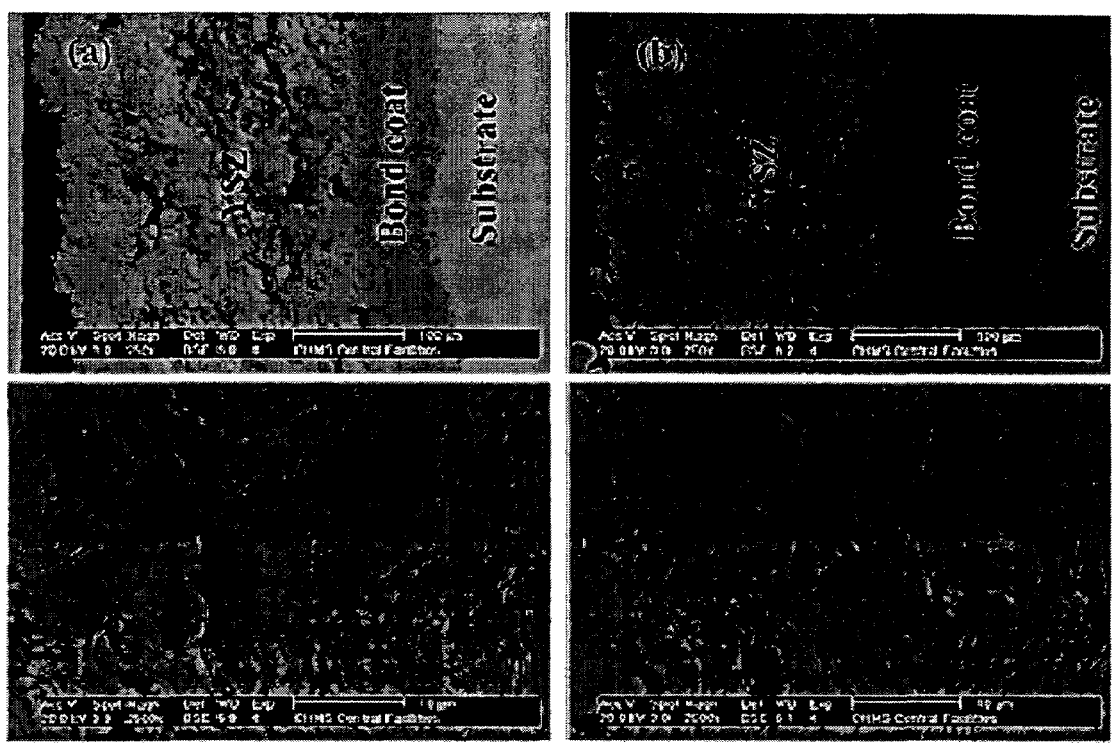
FIG. 6a is a backscattered electron microphotograph of a cross section of thermal barrier coating (TBC) using the cryomilled powder of the invention. The lower image is an enlargement of the bond coat shown in the upper image in which HVOF bond coats were formed using conditions that resulted in more heavily deformed particles and more oxide content in the as-sprayed bond coats.
FIG. 6b is a backscattered electron microphotograph of a cross section of thermal barrier coating (TBC) using conventional powder prepared without cryomilling. The lower image is an enlargement of the bond coat shown in the upper image in which HVOF bond coats were formed using conditions that resulted in more heavily deformed particles and more oxide content in the as-sprayed bond coats.
Figures 7A, 7B:
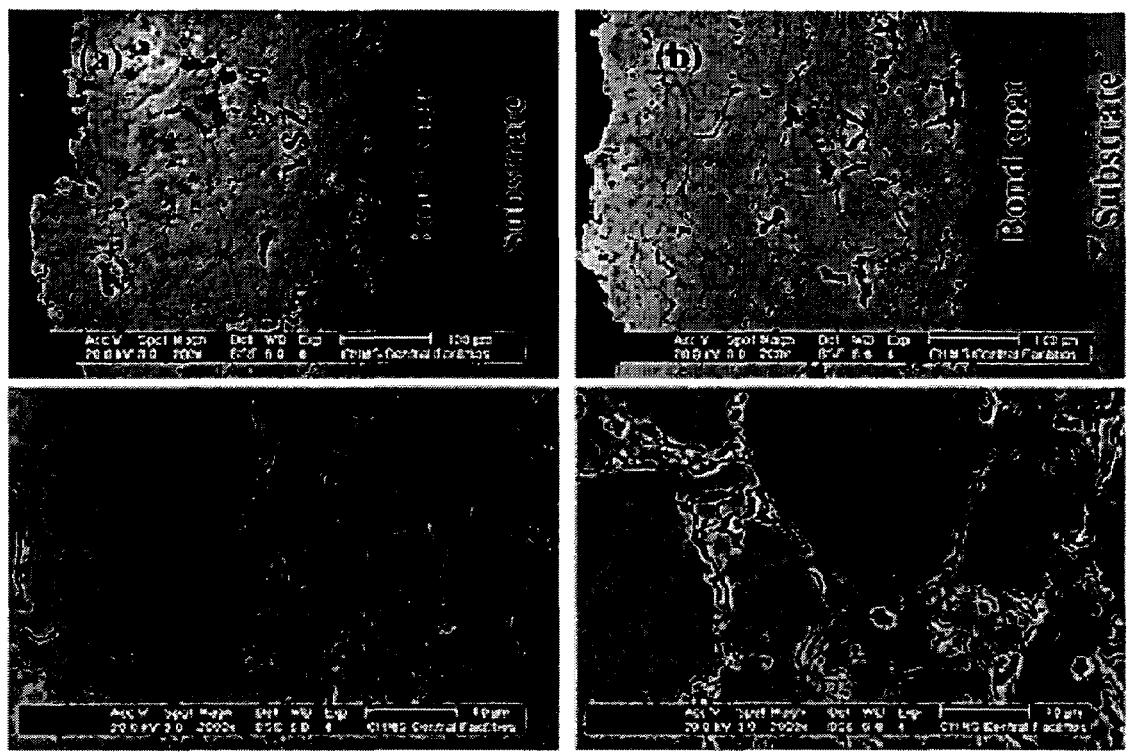
FIG. 7a is a backscattered electron microphotograph of a cross section of thermal barrier coating (TBC) using the cryomilled powder of the invention. The lower image is an enlargement of the bond coat shown in the upper image in which HVOF bond coats were formed using conditions that resulted in less heavily deformed particles and less oxide content in the as-sprayed bond coats.
FIG. 7b is a backscattered electron microphotograph of a cross section of thermal barrier coating (TBC) using conventional powder prepared without cryomilling. The lower image is an enlargement of the bond coat shown in the upper image in which HVOF bond coats were formed using conditions that resulted in less heavily deformed particles and less oxide content in the as-sprayed bond coats.

In contrast with the as-sprayed coating, the scale grown on the polished coating after exposure at 1000° C. for 1 and 24 hour is comprised primarily of α- and θ-alumina as shown by the XRD patterns in FIG. 2b. The BSE images of the oxide scales grown on the polished coating after 1 and 24 hour exposure at 1000° C. are shown in FIGS. 5a and 5b. These oxide scales are comprised of two layers, i.e., a continuous inner layer 12 coherent with the coating surface and an outer layer 14 made up of needle-like crystals above the continuous layer. It has been previously shown that θ-alumina usually has a needle-like (or whisker-like, blade-like) morphology, while α-alumina usually exhibits a dense, equiaxed structure. Accordingly, we conclude that the continuous layer is α-alumina and the layer with needle- or blade-like crystals is θ-alumina.

The experimental results show that the oxide scales grown on the as-sprayed and the polished coatings are significantly different. For the polished coating, an almost pure alumina scale was grown due to the fine-grain microstructure in the coating as shown in FIGS. 5a and 5b. For the as-sprayed coating, due to the oxidation of the coating surface during the HVOF thermal spray process, spinel-type oxides formed prior to the formation of alumina in the primary stage of oxidation as shown in FIG. 3. However, the spinel-type oxides formed in the primary stage of oxidation do not prohibit the formation of an alumina subscale after oxidation for a longer time.

Consider now a comparison of the isothermal oxidation behavior and thermal cycle lifetime between TBCs with cryomilled and conventional NiCrAlY bond coats. Commercially available gas atomized NiCrAlY powder was cryomilled in liquid nitrogen using a Model 1-S attritor with stainless steel balls for 8 hours. The NiCrAlY bond coat was thermal sprayed with a high velocity oxy-fuel (HVOF) process. For purpose of comparison, two types of bond coat were prepared using the as-received NiCrAlY powder and the cryomilled powder, respectively. Both of the bond coats with cryomilled powder and as-received powder were prepared with two HVOF conditions: one resulted in a bond coat with more heavily deformed particles and more oxide content around the particles (Group 1), the other resulted in a bond coat with less deformed particles and less oxide content around the particles (Group 2). The YSZ top coat was sprayed with an APS process. The two HVOF conditions were at higher temperatures, and lower temperatures respectively.

The cross sections of the TBC systems are shown in the microphotographs of FIGS. 6a-6d and 7a-7d. Hereafter, the TBC systems with bond coat using the cryomilled powder will be called MC1 (with more heavily deformed particles in bond coat) and MC2 (with less deformed particles in bond coat), and the TBC systems with bond coat using the as-received powder will be called CC1 (with more heavily deformed particles in bond coat) and CC2 (with less deformed particles in bond coat).

Figure 8A:
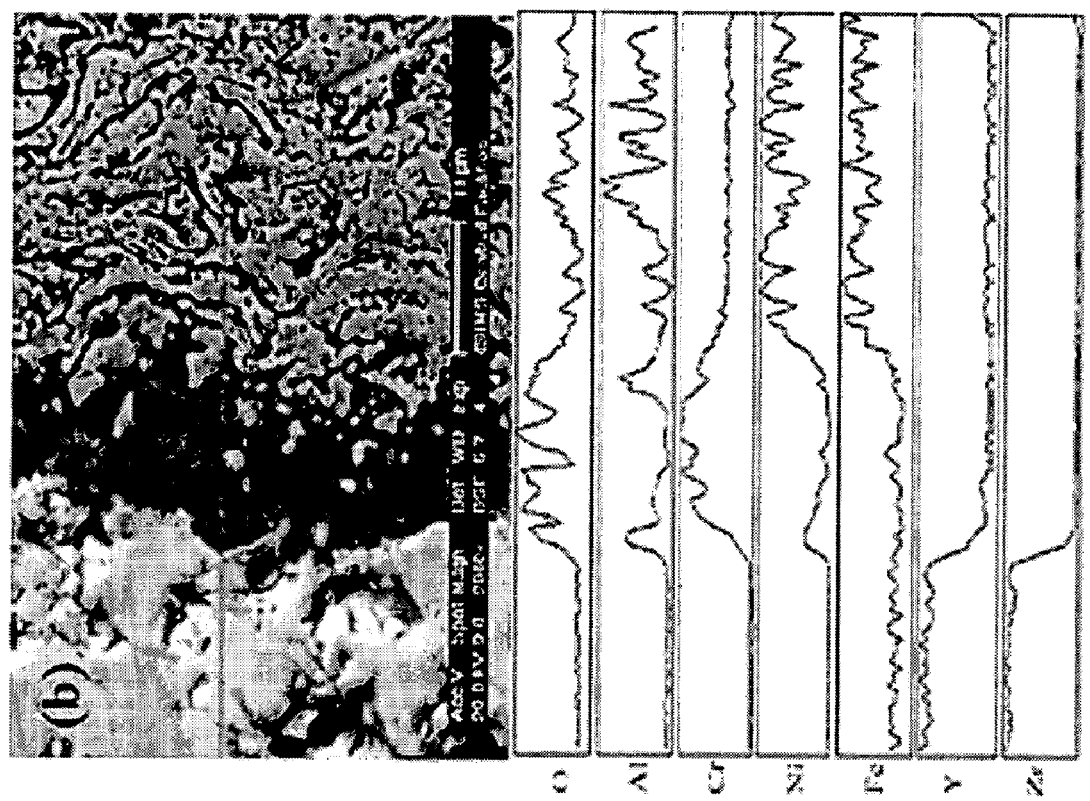
FIG. 8a is a backscattered electron microphotograph of a cross section of thermally grown oxide (TGO) on a coating prepared according to the invention after oxidation at 1000° C. for 330 hours in which HVOF bond coats were formed using conditions that resulted in more heavily deformed particles and more oxide content in the as-sprayed bond coats. The lower graphs are the energy dispersive x-ray spectrometry (EDS) line scans for the sample of O, Al, Cr, Ni, Fe, Y, and Zr respectively from top to bottom.
Figure 8B:
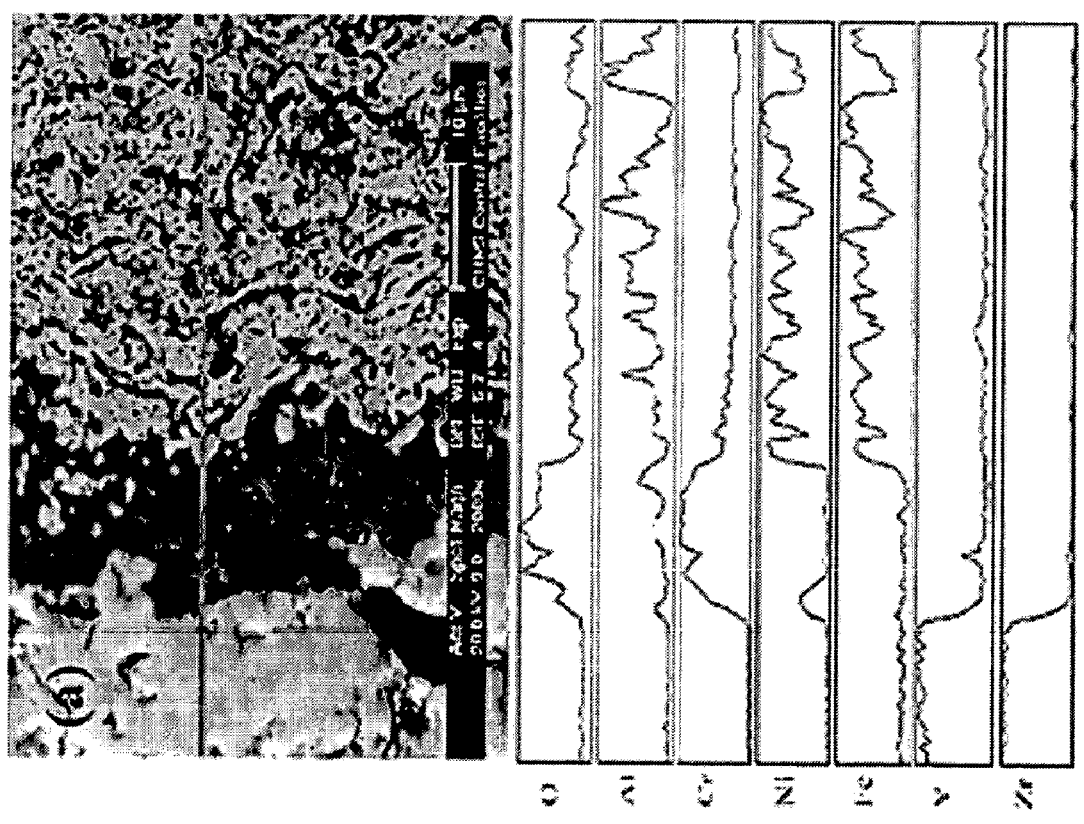
FIG. 8b is a backscattered electron microphotograph of a cross section of thermally grown oxide (TGO) on a conventional coating prepared without cryomilling after oxidation at 1000° C. for 330 hours in which HVOF bond coats were formed using conditions that resulted in more heavily deformed particles and more oxide content in the as-sprayed bond coats. The lower graphs are the energy dispersive x-ray spectrometry (EDS) line scans for the sample of O, Al, Cr, Ni, Fe, Y, and Zr respectively from top to bottom.

The TGOs grown on MC1 and CC1 after 330 hour exposure at 1000° C. are shown in microphotographs of FIGS. 8a and 8b. The morphologies of the TGOs in the two coatings are the same. The TGOs were porous, and the EDS analysis in FIGS. 8a and 8b shows that they are comprised of mainly $Cr_2O_3$.

Figures 9A, 9B:
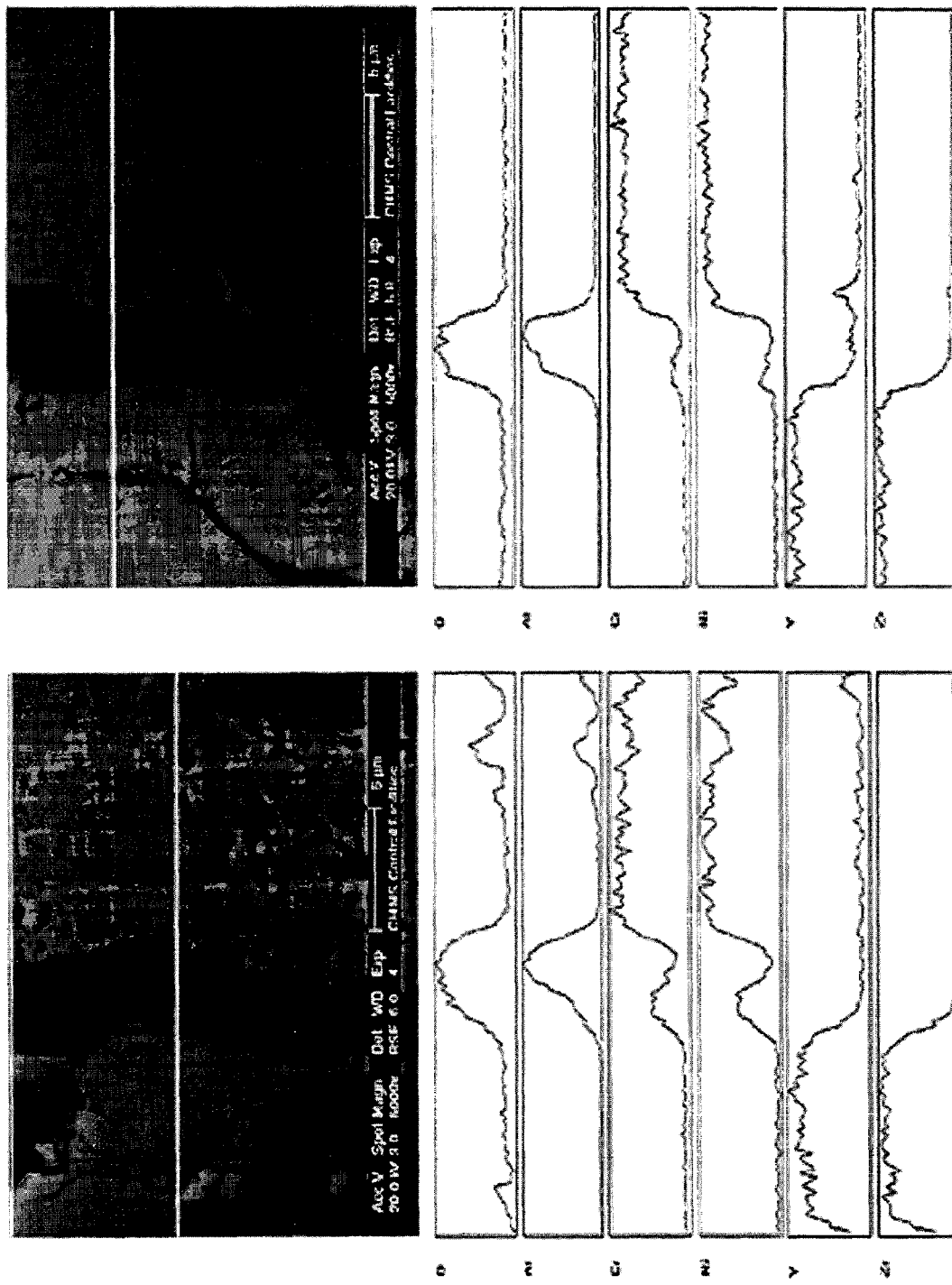
FIG. 9a is a backscattered electron microphotograph of a cross section of thermally grown oxide (TGO) on a coating prepared according to the invention after oxidation at 1000° C. for 330 hours in which HVOF bond coats were formed using conditions that resulted in less heavily deformed particles and less oxide content in the as-sprayed bond coats. The lower graphs are the energy dispersive x-ray spectrometry (EDS) line scans for the sample of O, Al, Cr, Ni, Fe, Y, and Zr respectively from top to bottom.
FIG. 9b is a backscattered electron microphotograph of a cross section of thermally grown oxide (TGO) on a conventional coating prepared without cryomilling after oxidation at 1000° C. for 330 hours in which HVOF bond coats were formed using conditions that resulted in less heavily deformed particles and less oxide content in the as-sprayed bond coats. The lower graphs are the energy dispersive x-ray spectrometry (EDS) line scans for the sample of O, Al, Cr, Ni, Fe, Y, and Zr respectively from top to bottom.
Figure 10:
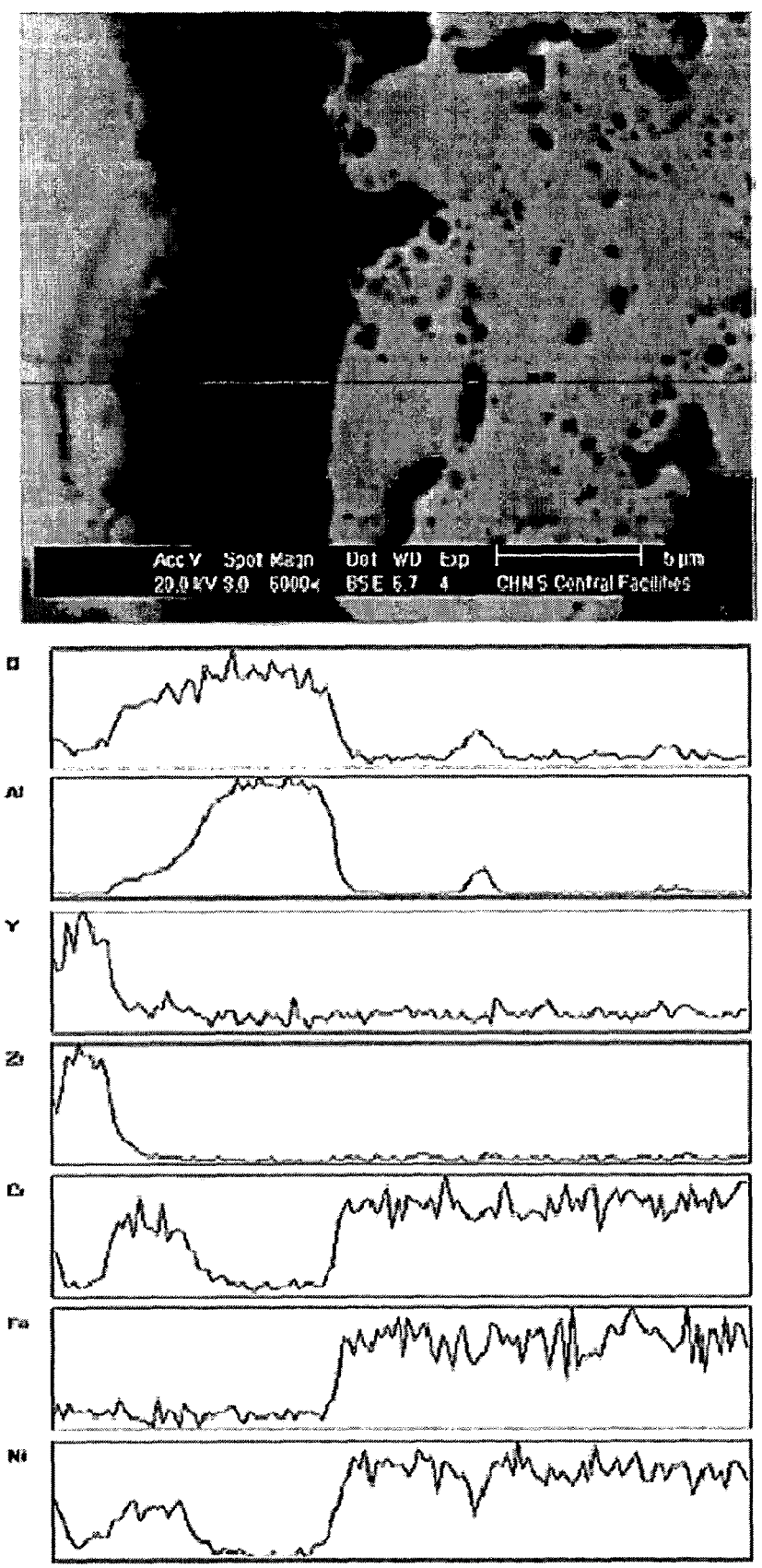
FIG. 10 is a backscattered electron microphotograph of a cross section of thermally grown oxide (TGO) on a coating prepared according to the invention after oxidation at 1000° C. for 1000 hours in which HVOF bond coats were formed using conditions that resulted in less heavily deformed particles and less oxide content in the as-sprayed bond coats. The lower graphs are the energy dispersive x-ray spectrometry (EDS) line scans for the sample of O, Al, Y, Zr, Cr, Fe, and Ni respectively from top to bottom.

The TGOs grown on MC2 and CC2 after 100 hour exposure and the TGO grown in MC2 after 1000 hour exposure at 1000° C. are shown in FIGS. 9a, 9b and 10. The YSZ top coat peeled off as a whole piece after 1000 hour exposure at 1000° C. The EDS analysis shows that, after 100 hour exposure at 1000° C., the TGOs grown in MC2 and CC2 were similar. Both of them were comprised of two layers. The inner layer, which adhered to the bond coat, was alumina, and the outer layer, which adhered to the YSZ top coat, was mainly $NiCr_2O_4$. After exposure for longer time as shown in FIG. 10, the two-layer structure of the TGO became more apparent and its composition remained the same.

The composition and structure of the TGO grown on Group 1 and Group 2 are significantly different. This finding indicates that the conditions used in the HVOF process can significantly affect the subsequent oxidation behavior of the coating.

MC2, made from the cryomilled powder, showed better oxidation resistance than CC2, because the YSZ top coat on CC2 peeled off after 1000 hour exposure at 1000° C., while the top coat on MC2 remained coherent under these same conditions.

The specimen used in the thermal cycle test had a circle surface of 25.4 mm in diameter. Cyclic oxidation experiments in air consisted of 10-min heat-up to 1121° C. (2050° F.), 40-min hold at 1121° C. (2050° F.), followed by a 10-min forced air quench. All of the specimens failed in a way that the YSZ top coat peeled off as a whole piece. The failure lifetime of MC1, CC1, MC2, and CC2 was 145, 241, 321, and 243 cycles, respectively, indicating that the coating prepared with the cryomilled powder and preferred HVOF spray conditions had the longest life.

MC1 and CC1 failed in the same mode. As the TGOs grown on them were porous as shown in FIGS. 8a and 8b, the failure was caused by the cracks inside the TGO.

Figure 11:
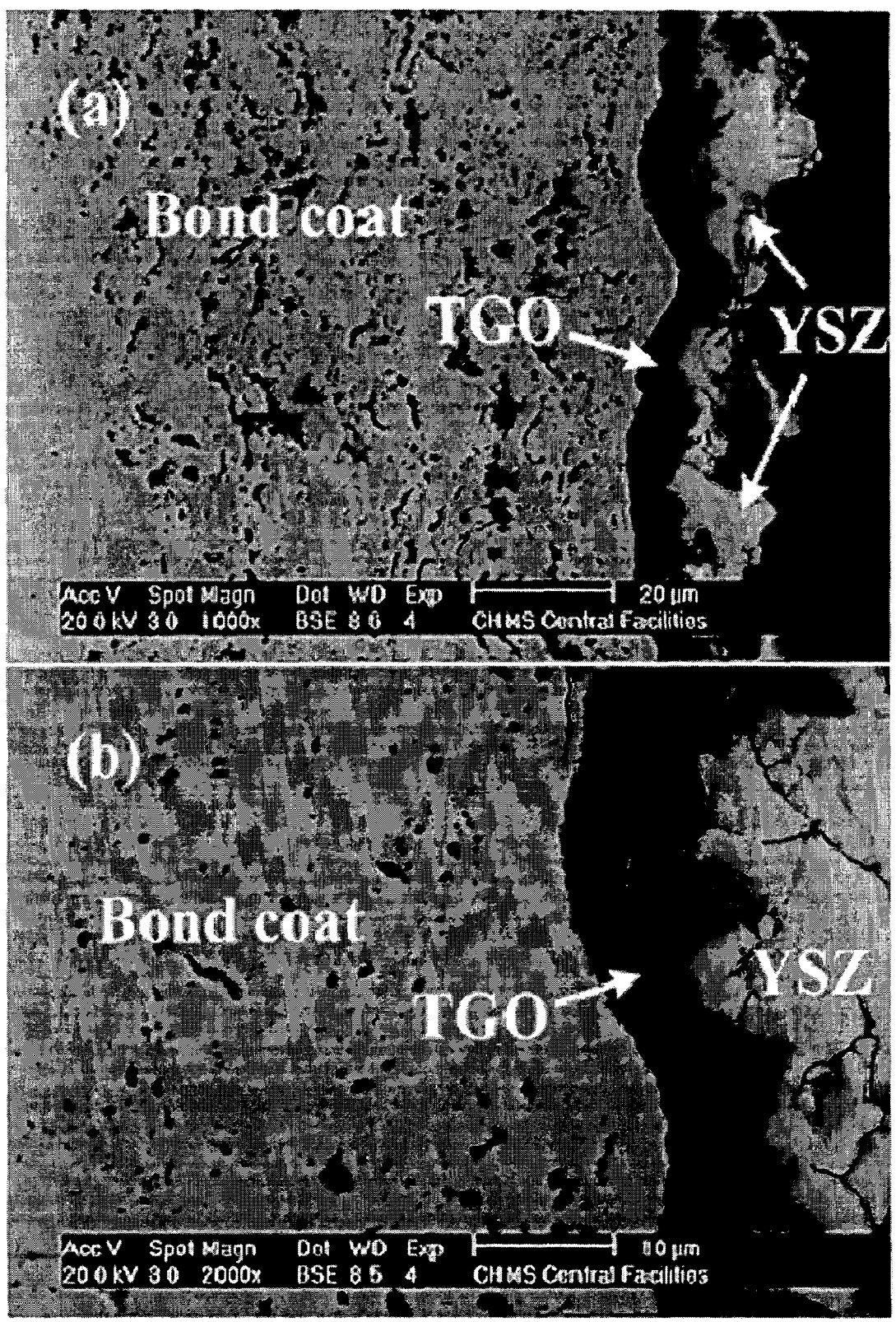
FIG. 11a is a backscattered electron microphotograph of a cross section of thermal barrier coating (TBC) prepared according to the invention after failure in a thermal cycle test at 1121° C. after 321 cycles in which HVOF bond coats were formed using conditions that resulted in less heavily deformed particles and less oxide content in the as-sprayed bond coats.
FIG. 11b is a backscattered electron microphotograph of a cross section of a conventional thermal barrier coating (TBC) prepared without cryomilling after failure in a thermal cycle test at 1121° C. after 243 cycles in which HVOF bond coats were formed using conditions that resulted in less heavily deformed particles and less oxide content in the as-sprayed bond coats.

MC2 and CC2 failed in two different ways. For MC2, a break occurred inside the top coat in a place about 10 microns into the TGO as shown in the microphotograph of FIG. 11a. However, for CC2, the peeling of the top coat was caused by cracks between the TGO and the bond coat as shown in the microphotograph of FIG. 11b. Due to the peeling of the TGO in CC2, the TGO that remained on the bond coat as shown in FIG. 11b was seldom observed.

Consider now the short time oxidation behavior of LPPS NiCrAlY coatings. Commercially available gas atomized NiCrAlY powder is cryomilled in liquid nitrogen using a Model 1-S attritor with stainless steel balls for 8 hours. The NiCrAlY bond coat is thermal sprayed using a low pressure plasma spray (LPPS) process. For purpose of comparison, two types of bond coat are prepared using the as-received NiCrAlY powder and the cryomilled powder, respectively.

Figures 12A, 12B:
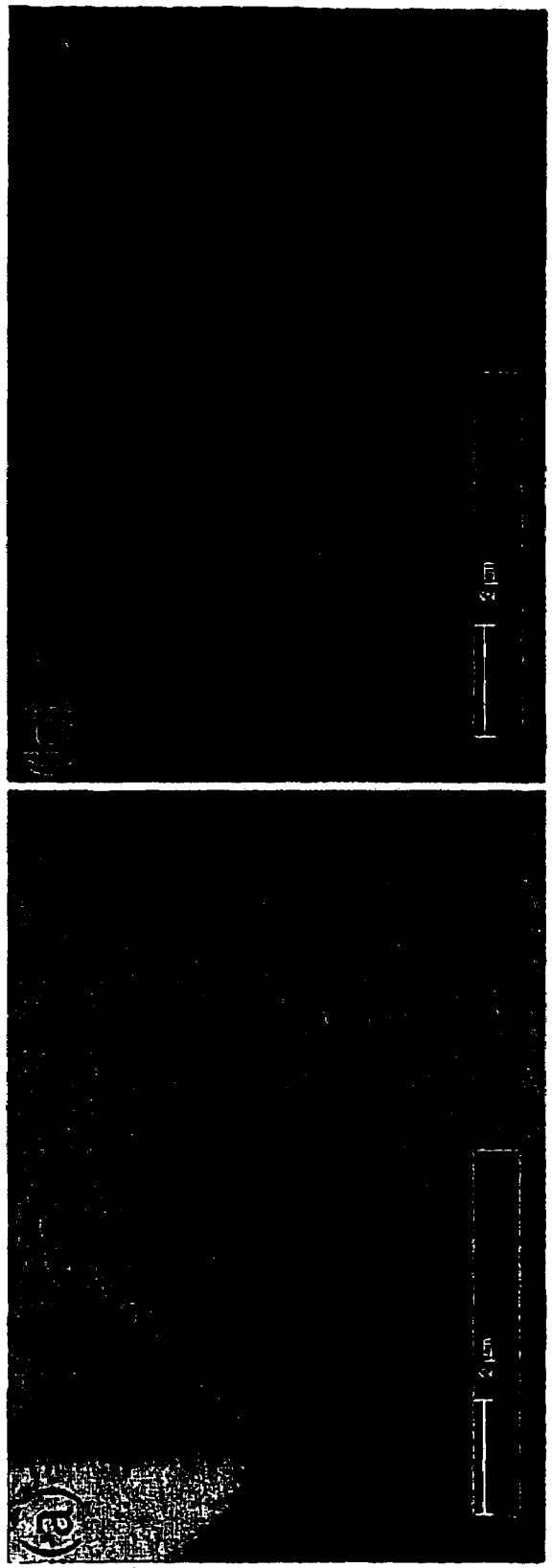
FIG. 12a is a backscattered electron microphotograph of a cross section of a conventionally prepared, low pressure plasma sprayed (LPPS) NiCrAlY coating in the region of an indentation mark.
FIG. 12b is a backscattered electron microphotograph of a cross section of a low pressure plasma sprayed (LPPS) NiCrAlY coating prepared according to the invention in the region of an indentation mark.

The coating produced using the LPPS technique presented negligible porosity. Both powders are melted during spray (splat morphology observation) and both presented fine microstructure. The fine and similar microstructure is a consequence of rapid solidification during splat impact. Despite the fact that the grain structure as shown in the SEM is on the same order of magnitude, namely 100-300 microns, as shown in FIGS. 12a and 12b, the nano sample is about 20% harder compared with the conventional one (HV300 g): 682±52 to 574±56.

Figure 13:
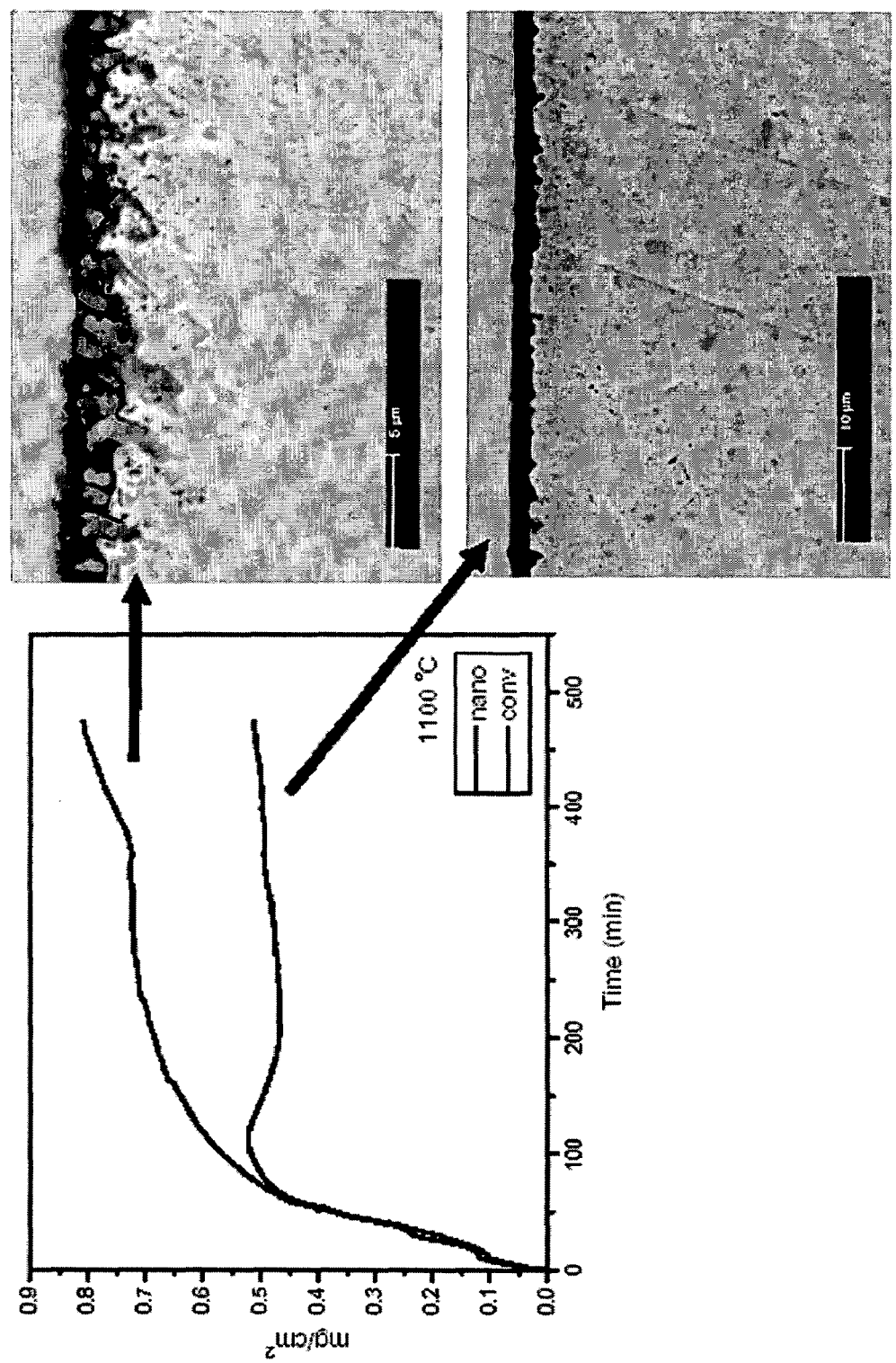
FIG. 13 is a graph of a thermogravimetric analysis plot for a conventional and cryomilled or nano-LPPS coating in the upper and lower graph lines respectively after 7 hours at 1100° C. showing a second phase besides the alumina in the thermally grown oxide layer of the conventional coating, which phase is rich in Y and which is not observed in the nano-coating. The graph lines are associated by the arrows with respective microphotographs of cross sections of the coatings.
Figure 14:
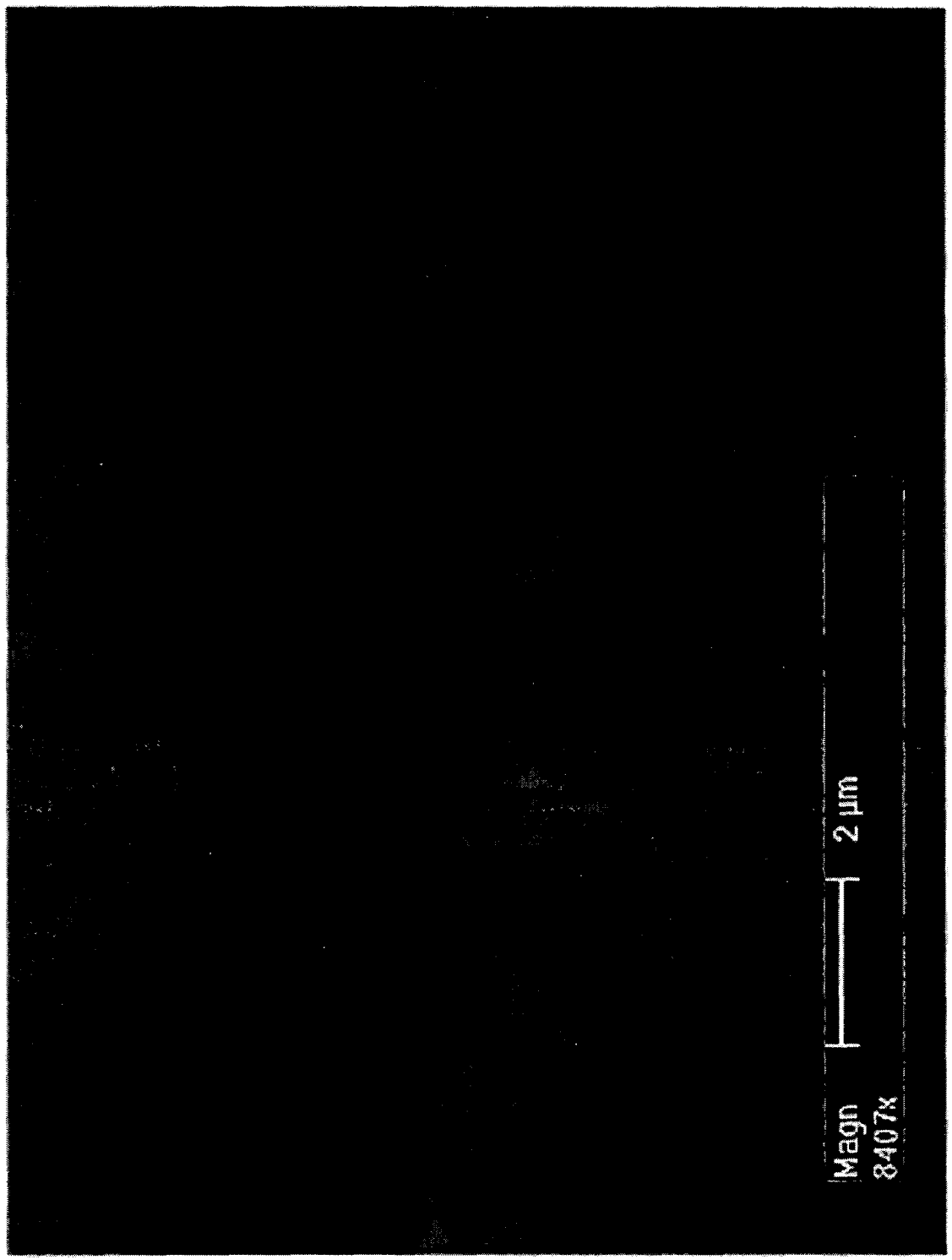
FIG. 14 is a highly magnified microphotograph of a cross section of a thermally grown oxide layer on a conventional LPPS NiCrAlY coating after 7 hours at 1100° C., which shows the homogeneous alumina layer with large secondary phases rich in yttrium.
Figure 15:
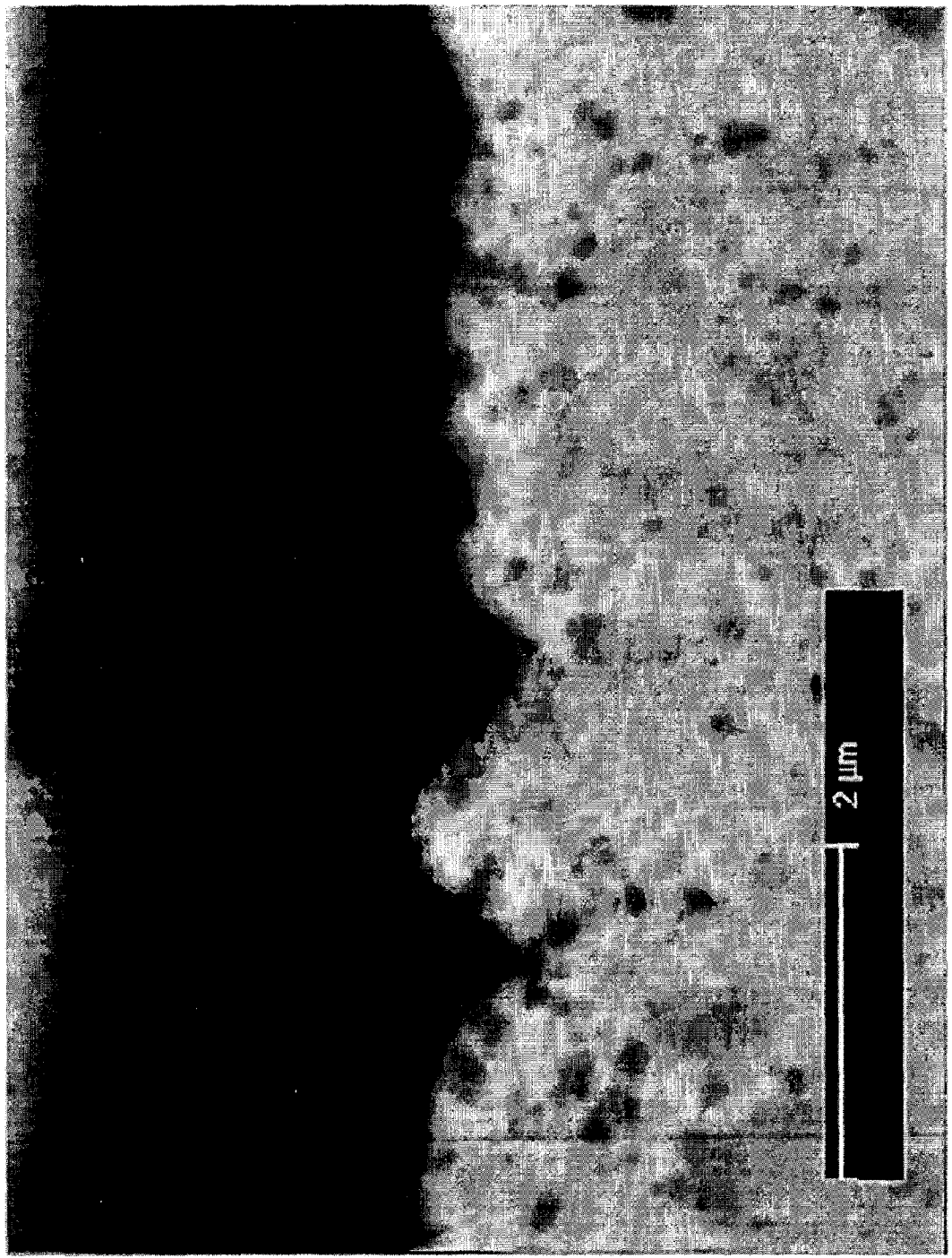
FIG. 15 is a highly magnified microphotograph of a cross section of a thermally grown oxide layer on a cryomilled LPPS NiCrAlY coating after 7 hours at 1100° C., which shows the homogeneous and dense alumina layer with very fine and dispersed phases rich in yttrium.

The oxidation behavior of the LPPS nanostructured NiCrAlY coating was examined after 7 hours at 1100° C. exposure using a thermogravimetric analyzer apparatus and the results are shown in FIG. 13. XRD data (not shown here) confirmed the presence of an α-alumina layer on both coatings after 7 h at 1100° C.; no other oxide phases were observed. On both coatings, similar TGO and Al-depleted area thicknesses were observed. Nevertheless, higher magnification micrographs of the TGO layer on both coatings as shown in FIG. 14 with conventional LPPS and in FIG. 15 nano or cryomilled LPPS show a very distinctive microstructure between the samples.

Figure 16:
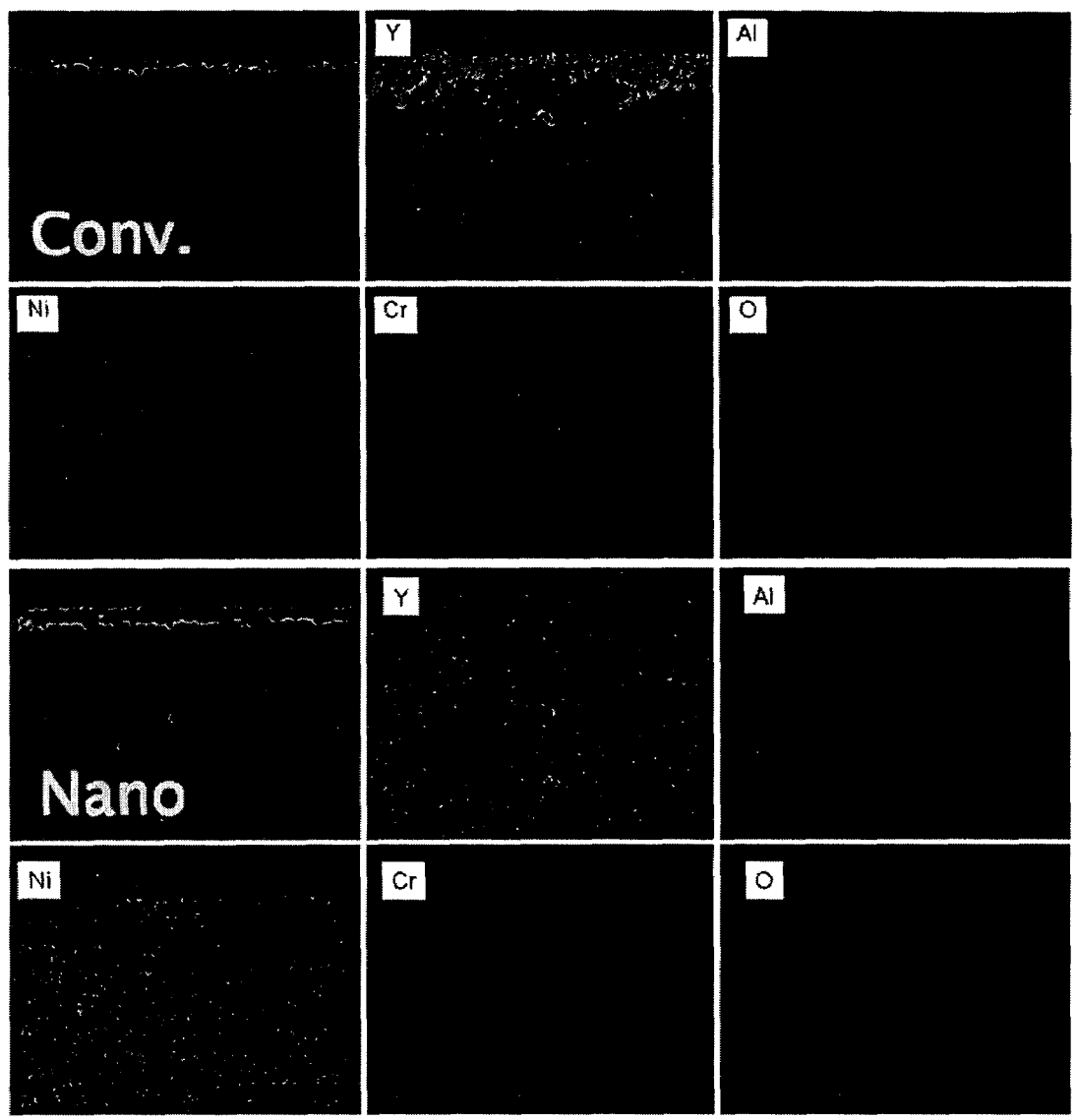
FIG. 16 is an array of a microphotograph and corresponding two dimensional EDS plots of elemental mappings for Y, Al, Ni, Cr and O of a cross section next to the thermally grown oxide layer on a conventional LPPS coating in the top two rows and a nanocryomilled coating according to the invention in the bottom two rows after 7 hours at 1100° C. showing the presence of a homogeneous alumina layer in both, but with a dramatically different Yttrium distribution.
Figure 17:
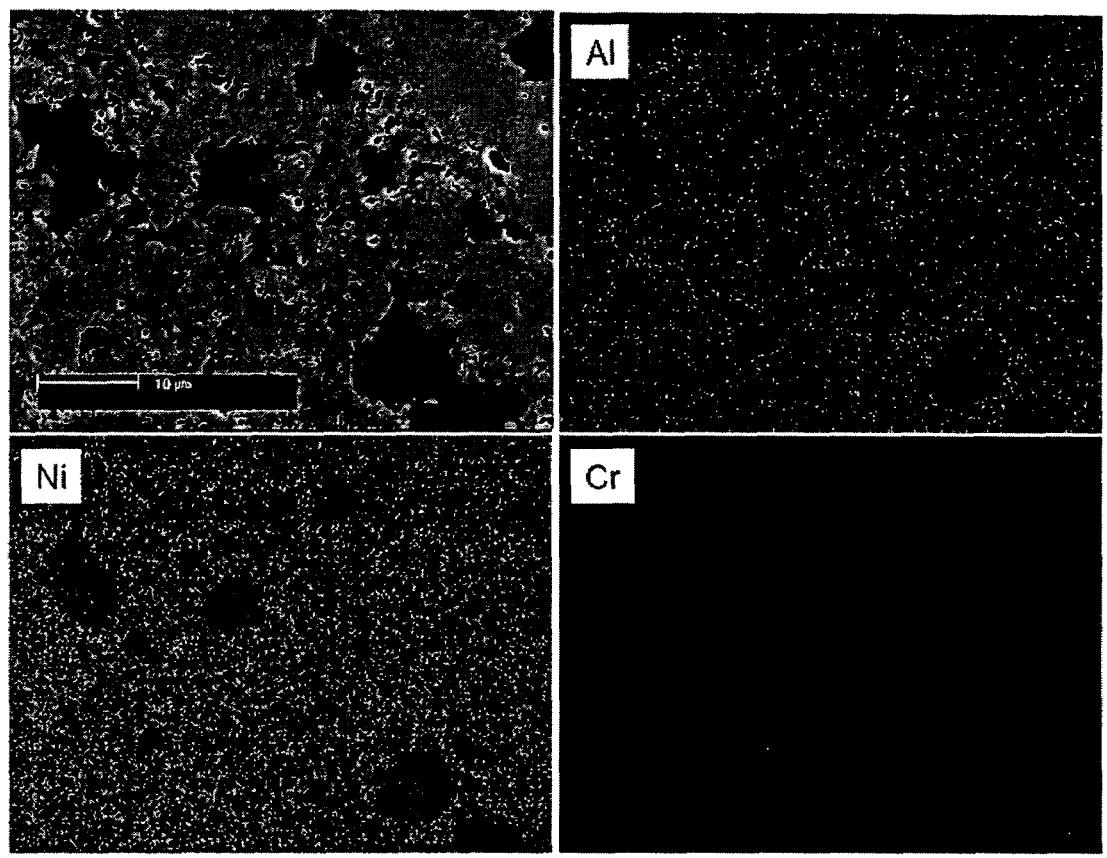
FIG. 17 is an array of a microphotograph and corresponding two dimensional EDS plots of elemental mappings for Al, Ni, and Cr of a cross section showing the segregation of Cr in Ni—Al rich phases.

The major difference between the samples is the presence of a large second oxide phase inside the TGO and in the interface between the TGO and conventional bond coat. This second phase is rich in yttrium according to two dimensional elemental mappings shown in FIG. 16. The same phase is observed in the nano coating but at a very fine scale. A second important microstructural difference is the size of the Ni—Al β phase, which is finer in the nano coating which shows up as black areas in the Cr frame mapping on both samples. The third main difference is the fact that Cr metal is segregating in the nano sample. Cr rich areas or particles are seen in the Cr frame mapping. This behavior is not observed in the conventional sample. The Cr segregation is apparently enhanced at higher temperatures (1300° C.) even for a shorter period of time (2 hours), as shown in the two dimensional elemental mappings in FIG. 17. One reasonable explanation for this behavior is the fact that the nano powder after cryomilling forms a solid solution with all the constituent metals of the alloy. After the thermal spay of the NiCrAlY sample one should expect two major phases in the microstructure: the Ni—Cr rich matrix and the Ni—Al rich phases. Other small phases like $Ni_3Al$ are also expected but cannot be seen in the SEM micrographs but are seen in the XRD patterns. In the case of the nano sample, the Cr is in solid solution after cryomilling and after spraying (rapid solidification), and when the Ni—Al phase evolves, it has a high concentration of Cr in it, which segregated after being exposed to high temperatures. This explains the presence of Cr rich particles inside Ni—Al rich phases as shown in FIG. 17 and not in the Ni matrix (high Cr solubility).

Figure 18:
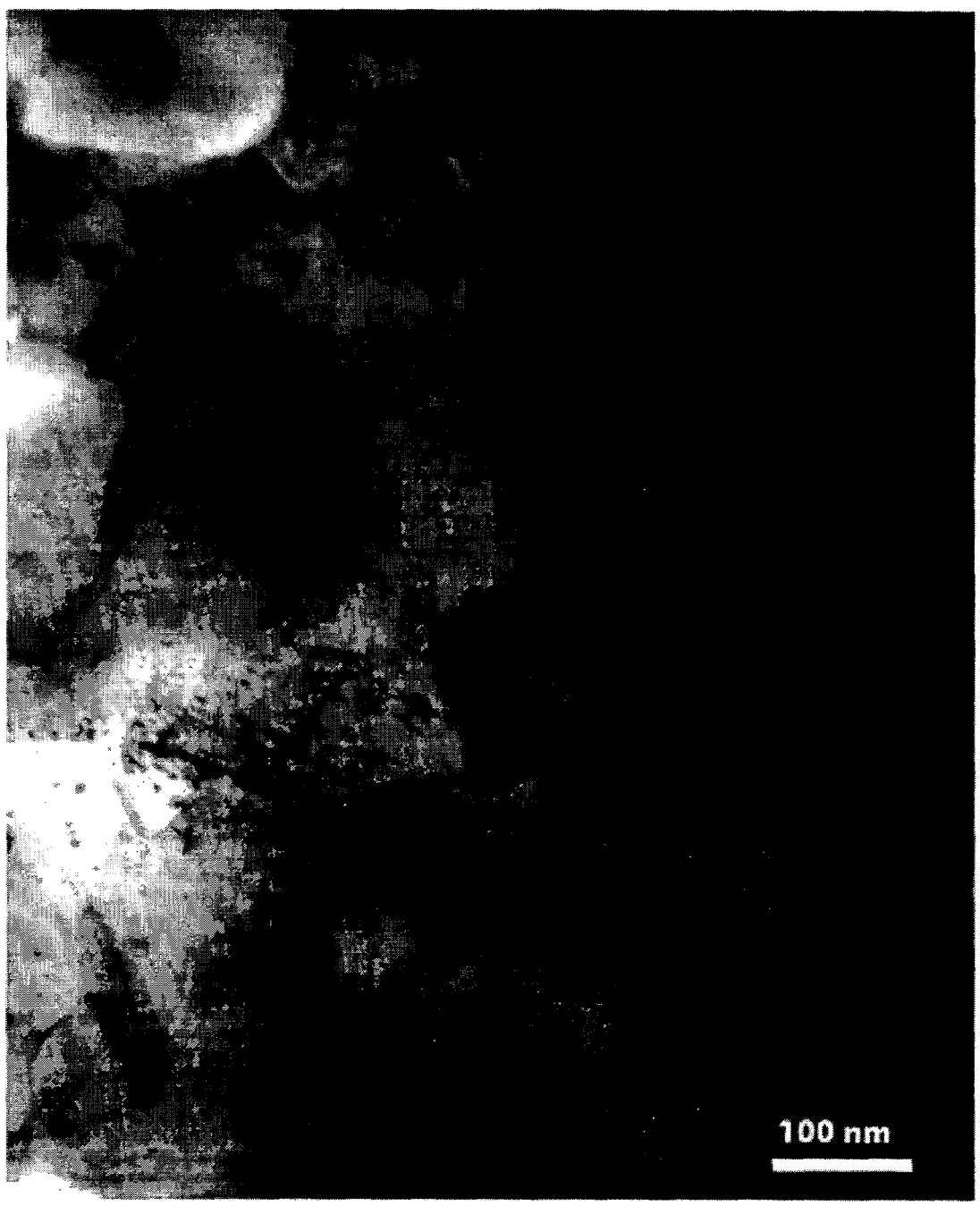
FIG. 18 is a transmission electron micrograph showing grain size distribution in a nanocryomilled LPPS NiCrAlY coating.
Figure 19:
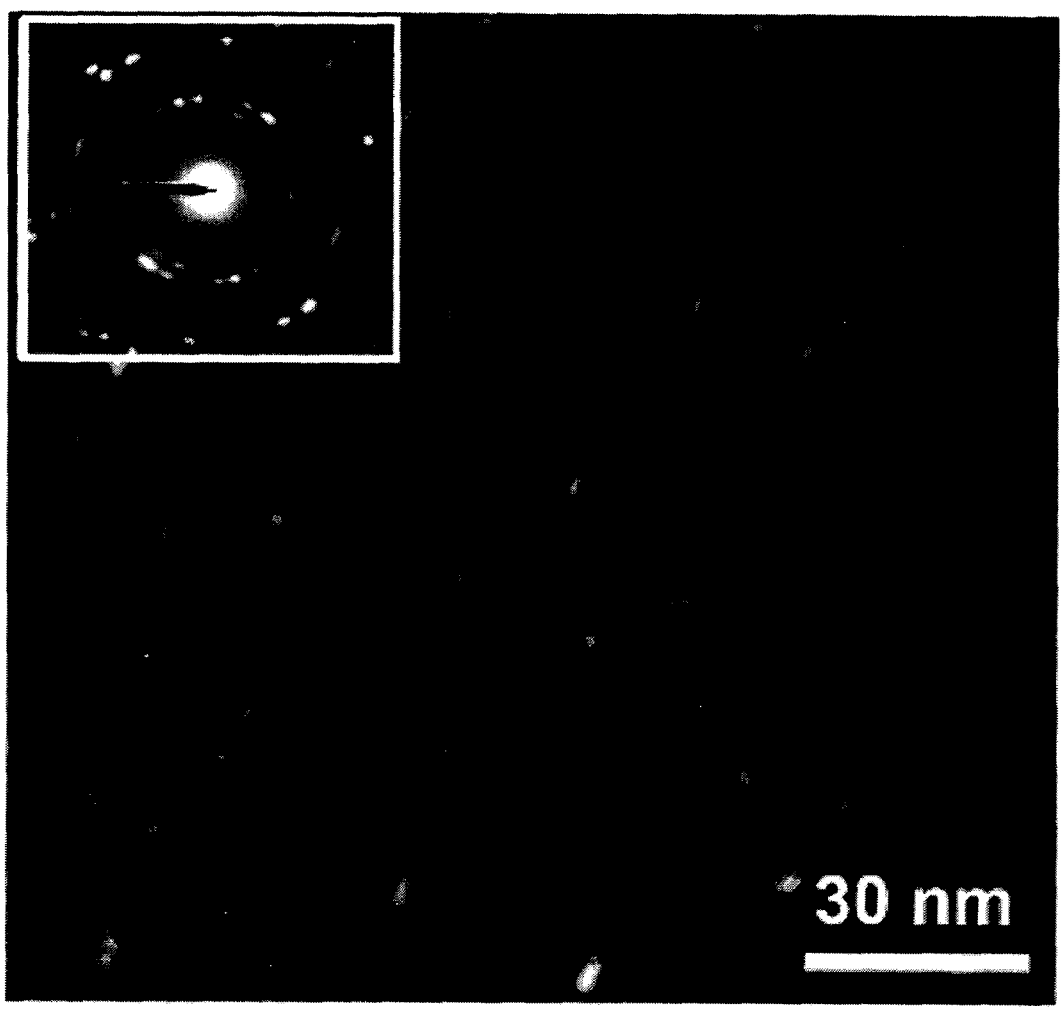
FIG. 19 is an enlarged magnification of an as-sprayed cryomilled LPPS NiCrAlY coating showing the presence of a very fine scale dispersoids through out a 2-5 nm microstructure.

At a very small scale as shown in the TEM micrographs of FIG. 18, one can observe that the grain size of the coating as-sprayed are in the range of hundreds of nanometers (100-300 nm). Moreover, one can observe in the enlarged TEM micrographs of FIG. 19 (dark field) the presence of a very fine-scale distribution of dispersoids throughout the microstructure. The characterization of the dispersoids phase is still not completed, but initial results (SAD patterns) show a high probability that these phases are aluminum oxides. Nitrides and oxy-nitrides are also possible candidates (including yttrium-contaminant phases).

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for improving a MCrAlY thermal barrier coating made from MCrAlY powder, where M is a metal or metal alloy, comprising:
   providing a MCrAlY bond coat on a substrate; and
   providing a nanocrystalline nano-composite metallic powder coating on the MCrAlY bond coat where the nanostructured nano-composite-coating is prepared by refining the microstructure of a metallic alloy system consisting of MCrAlY powder used to make the nanostructure nano-composite coating to nanocrystalline grain size.

2. The method of claim 1 where refining the microstructure of the MCrAlY powder to nanocrystalline grain size comprises cryomilling the MCrAlY powder to nanocrystalline grain size including in-situ formation of oxides, nitrides and/or oxynitrides.

3. A method for improving a MCrAlY thermal barrier coating made from MCrAlY powder, where M is a metal or metal alloy, comprising:
   providing a MCrAlY bond coat on a substrate; and
   providing a nanocrystalline nano-composite coating on the MCrAlY bond coat where the nanostructured nano-composite-coating is prepared by refining the microstructure of a MCrAlY powder and alumina used to make the nanostructure nanocomposite coating to nanocrystalline grain size, where refining the microstructure of the MCrAlY powder to nanocrystalline grain size comprises cryomilling the MCrAlY powder and refining the microstructure of the MCrAlY powder to nanocrystalline grain size during cryomilling through the introduction of $Al_2O_3$ particles added during cryomilling.

4. The method of claim 3 where refining the microstructure of the MCrAlY powder to nanocrystalline grain size achieved after cryomilling comprises introducing nano alumina whiskers during cryomilling.

* * * * *